United States Patent
Oukid et al.

(10) Patent No.: US 9,720,774 B2
(45) Date of Patent: Aug. 1, 2017

(54) ADAPTIVE RECOVERY FOR SCM-ENABLED DATABASES

(71) Applicant: SAP SE, Walldorf (DE)

(72) Inventors: Ismail Oukid, Leimen (DE); Anisoara Nica, Waterloo (CA); Peter Bumbulis, Cambridge (CA); Wolfgang Lehner, Dresden (DE); Thomas Willhalm, Sandhausen (DE)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 14/753,521

(22) Filed: Jun. 29, 2015

(65) Prior Publication Data

US 2016/0378601 A1 Dec. 29, 2016

(51) Int. Cl.
*G06F 11/00* (2006.01)
*G06F 11/14* (2006.01)
*G06F 3/06* (2006.01)

(52) U.S. Cl.
CPC ............ *G06F 11/142* (2013.01); *G06F 3/068* (2013.01); *G06F 3/0619* (2013.01); *G06F 3/0644* (2013.01); *G06F 2201/80* (2013.01)

(58) Field of Classification Search
None
See application file for complete search history.

(56) References Cited

U.S. PATENT DOCUMENTS

| | | | | | |
|---|---|---|---|---|---|
| 6,079,029 | A * | 6/2000 | Iwatani | ............... | G06F 11/1084 714/6.12 |
| 8,549,533 | B2 * | 10/2013 | Kanso | .................... | G06F 9/505 718/105 |
| 2009/0106221 | A1 * | 4/2009 | Meyerzon | ......... | G06F 17/30864 |
| 2009/0106235 | A1 * | 4/2009 | Tankovich | ........ | G06F 17/30864 |
| 2009/0222823 | A1 * | 9/2009 | Parkinson | ............... | G06F 9/466 718/101 |
| 2013/0067174 | A1 * | 3/2013 | Moss | ................... | G06F 11/1076 711/154 |
| 2015/0234719 | A1 * | 8/2015 | Coronado | ............. | G06F 11/203 714/6.3 |
| 2015/0278019 | A1 * | 10/2015 | Fagiano | ............... | G06F 11/2069 714/6.23 |

(Continued)

OTHER PUBLICATIONS

Oukid, Ismail et al. "Instant Recovery for Main-Memory Databases", 7th Biennial Conference on Innovative Data System Research (CIDR'15), Jan. 4-7, 2015, Asilomar, California, USA, 9pgs.

(Continued)

*Primary Examiner* — Kamini Patel
(74) *Attorney, Agent, or Firm* — Buckley, Maschoff & Talwalkar LLC

(57) ABSTRACT

A system includes determination of a plurality of secondary data structures of a database to be rebuilt, determination, for each of the plurality of secondary data structures, of a current ranking based on a pre-crash workload, a crash-time workload, the post-crash workload, and a rebuild time of the secondary data structure, determination to rebuild one of the plurality of secondary data structures based on the determined rankings, and rebuilding of the one of the plurality of secondary data structures in a dynamic random access memory based on primary data of a database stored in non-volatile random access memory.

17 Claims, 7 Drawing Sheets

(56) References Cited

U.S. PATENT DOCUMENTS

2015/0355981 A1* 12/2015 Booss ................. G06F 11/1474
707/674
2015/0378822 A1* 12/2015 Grube ................. G06F 11/1092
714/763
2016/0004552 A1* 1/2016 Innan .................... G06F 9/5088
718/1

OTHER PUBLICATIONS

Oukid, Ismail et al. "SOFORT: A Hybrid SCM-DRAM Storage Engine for Fast Data Recovery", DaMON'14, Jun. 22-27, 2014, Snowbird, UT, USA, ACM 978-1-4503-2971-2/14/06, http://dx.doi.org/10.1145/2619228.2619236, 7pgs.

* cited by examiner

ADAPTIVE RECOVERY FOR SCM-ENABLED DATABASES

BACKGROUND

Conventional database systems generate data backups and log backups during operation. These backups may be used to recover from database crashes, by restoring the database to the state of a data backup, and then replaying selected log backups in sequence. Modern systems change this paradigm by storing the data of an executing database instance in Storage Class Memory (SCM).

SCM is a non-volatile memory and therefore data stored in SCM remains unaffected before, during, and after a database crash. SCM may be implemented using flash-based memory connected to a processor vie PCIe interconnect technology, but other variants are known. SCM provides an intermediate step between high-performance Dynamic Random Access Memory (DRAM) and cost-effective hard disk drives (HDDs). SCM may provide read performance similar to DRAM and write performance that is significantly faster than HDD technology. Since a crash does not affect data stored in SCM, database recovery is extremely fast and simple as compared to conventional systems.

According to these implementations, data recovery is almost instantaneous. This improved recovery time is achieved at the cost of database throughput, since performance-enhancing data structures such as indexes are also stored in SCM, and read and write latencies of SCM are greater than those of Dynamic Random Access Memory (DRAM), in which the data structures may otherwise be stored. Some implementations attempt to improve this throughput by storing these data structures in DRAM and, after a crash, recovering the tabular data, rebuilding the DRAM-based secondary data structures based on the tabular data, and then accepting incoming requests.

DETAILED DESCRIPTION

The following description is provided to enable any person in the art to make and use the described embodiments and sets forth the best mode contemplated for carrying out some embodiments. Various modifications, however, will remain readily apparent to those in the art.

According to some embodiments, performance-enhancing database data structures are characterized in terms of their relationship to the database workload, and an order of recovery of the data structures is determined based on the characterizations. Some embodiments thereby provide database recovery while reducing the impact of recovery on request throughput during the recovery period.

Figure 1:
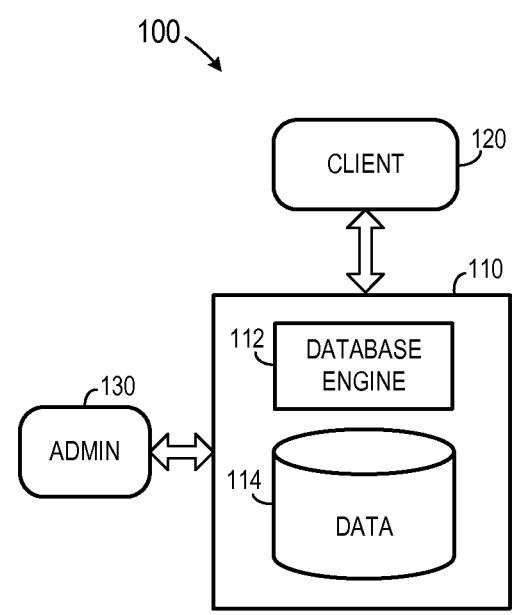
FIG. 1 is a block diagram of a database system.

FIG. 1 is a block diagram of system 100 according to some embodiments. System 100 includes database 110, client 120 and administrator 130. Generally, client 120 requests and receives data from database system 110. More particularly, database engine 112 of database system 110 manages data 114, and provides data of data 114 to client 120 in response to requests received therefrom.

Database system 110 may comprise any query-responsive data source or sources that are or become known, including but not limited to a structured-query language (SQL) relational database management system. Data 114 may comprise a relational database, a multi-dimensional database, an eXtendable Markup Language (XML) document, or any other data storage system storing structured and/or unstructured data. Data 114 may be distributed among several relational databases, multi-dimensional databases, and/or other data sources. Embodiments are not limited to any number or types of data sources.

In some embodiments, data 114 comprises one or more of conventional tabular data, row-based data stored in row format, column-based data stored in columnar format, and object-based data. Database system 110 may also or alternatively support multi-tenancy by providing multiple logical database systems which are programmatically isolated from one another. Moreover, data 114 may be indexed and/or selectively replicated in an index to allow fast searching and retrieval thereof.

Database system 110 may implement an "in-memory" database, in which Random Access Memory (i.e., DRAM, SCM, etc., and any combination thereof) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Administrator 130 provides management of database system 110. For example, administrator 130 may define the structure of tables within data 114, initiate backup operations, and instruct database engine 112 to recover database 110 after a crash, as described below.

Administrator 130 and client 120 of system 100 may comprise one or more devices executing program code of a software application for presenting user interfaces to allow interaction with its respective database system. Presentation of a user interface may comprise any degree or type of rendering. For example, administrator 130 may execute a Web Browser to receive a Web page (e.g., in HTML format) from database system 110, and may render and present the Web page according to known protocols. Each administrator or client may also or alternatively present user interfaces by executing a standalone executable file (e.g., an .exe file) or code (e.g., a JAVA applet) within a virtual machine.

Figure 2:
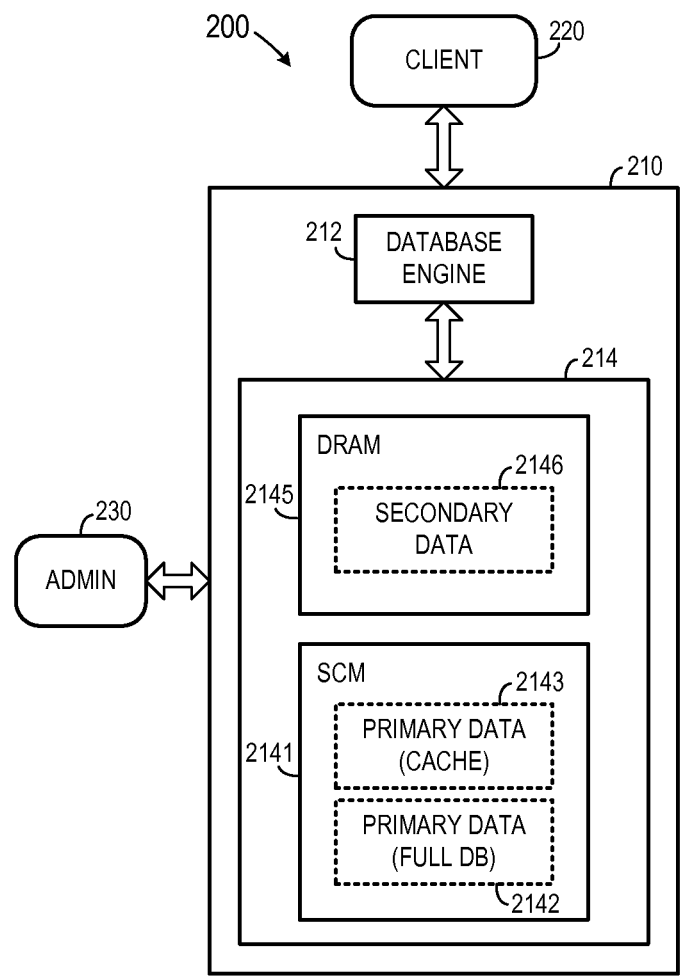
FIG. 2 is a block diagram of a database system according to some embodiments.

FIG. 2 is a block diagram of a system according to some embodiments. System 200 may comprise an implementation of system 100 of FIG. 1. System 100 includes database system 210, which in turn includes database engine 212 and data 214.

Data 214 is apportioned among SCM 2141 and DRAM 2145. SCM 2141, also known as Storage Class Memory (SCM), may combine the low latency and byte-addressability of Dynamic Random Access Memory (DRAM) with the non-volatility, density and economic characteristics of existing non-volatile storage media such as hard disk drives and solid state drives. SCM 2141 may exhibit asymmetric latencies in the same range as DRAM 2145, with writes being slower than reads.

SCM 2141 stores primary data 2142 and primary data 2143. Primary data 2142 stores all tables of database 210 and may be read-optimized Primary data 2143 stores a database cache (i.e., a subset of all the database tables), and may be write-optimized or read/write-optimized. As is known in the art, database engine 212 may operate upon cached data of primary data 2143, which is periodically merged with primary data 2142, for example when flushing primary data 2143 due to its size or other characteristic.

Figure 3:
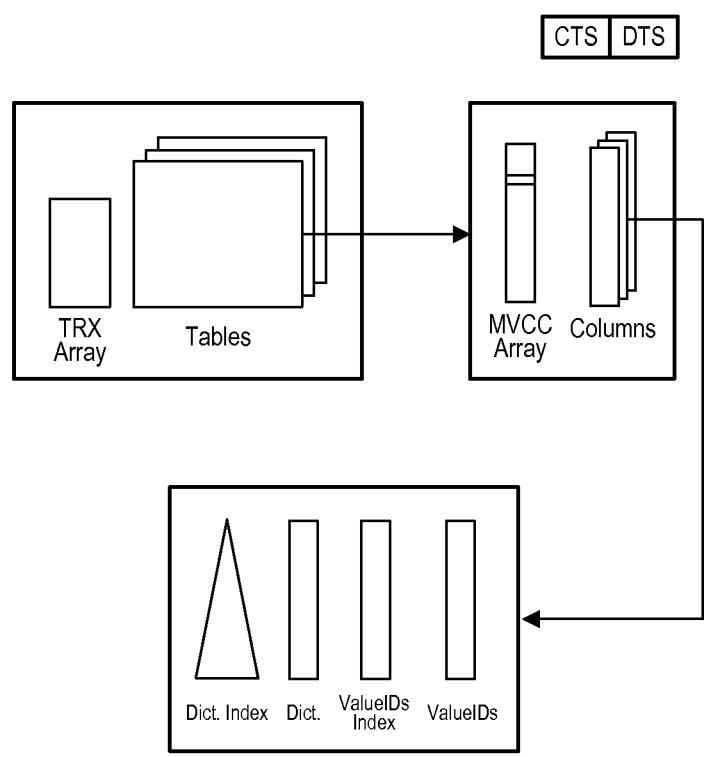
FIG. 3 is a block diagram of data structures and their interrelationships according to some embodiments.

FIG. 3 illustrates storage of database tables according to some embodiments. As shown, each table is stored as a collection of columns. Each column consists of an unsorted dictionary (Dict.), stored as an array of unique values, and an array of value ids (ValueIDs), where a value id is simply an index to the unsorted dictionary index. These two arrays, which together hold all the data of the database tables, are referred to herein as primary data.

FIG. 3 illustrates dictionary-encoding, in which inserted values are assigned code-values by the column dictionary (Dict.) and these code-values are then inserted in the actual column array (ValueIDs). Embodiments are not limited to columnar storage.

Returning to FIG. 2, DRAM 2145 stores data structures which are used to enhance processing throughput, including dictionary indexes (Dict. Index) that map values to value ids and inverted indexes (ValueIDs Index) that map value ids to row ids. These data structures are referred to as secondary data structures, and can be reconstructed from the primary data. More generally, primary data includes all data whose loss would result in a loss of information, while secondary data includes data whose loss would not result in loss of information. Secondary data structures may also include materialized views, intermediate cached results, etc.

Figure 4:
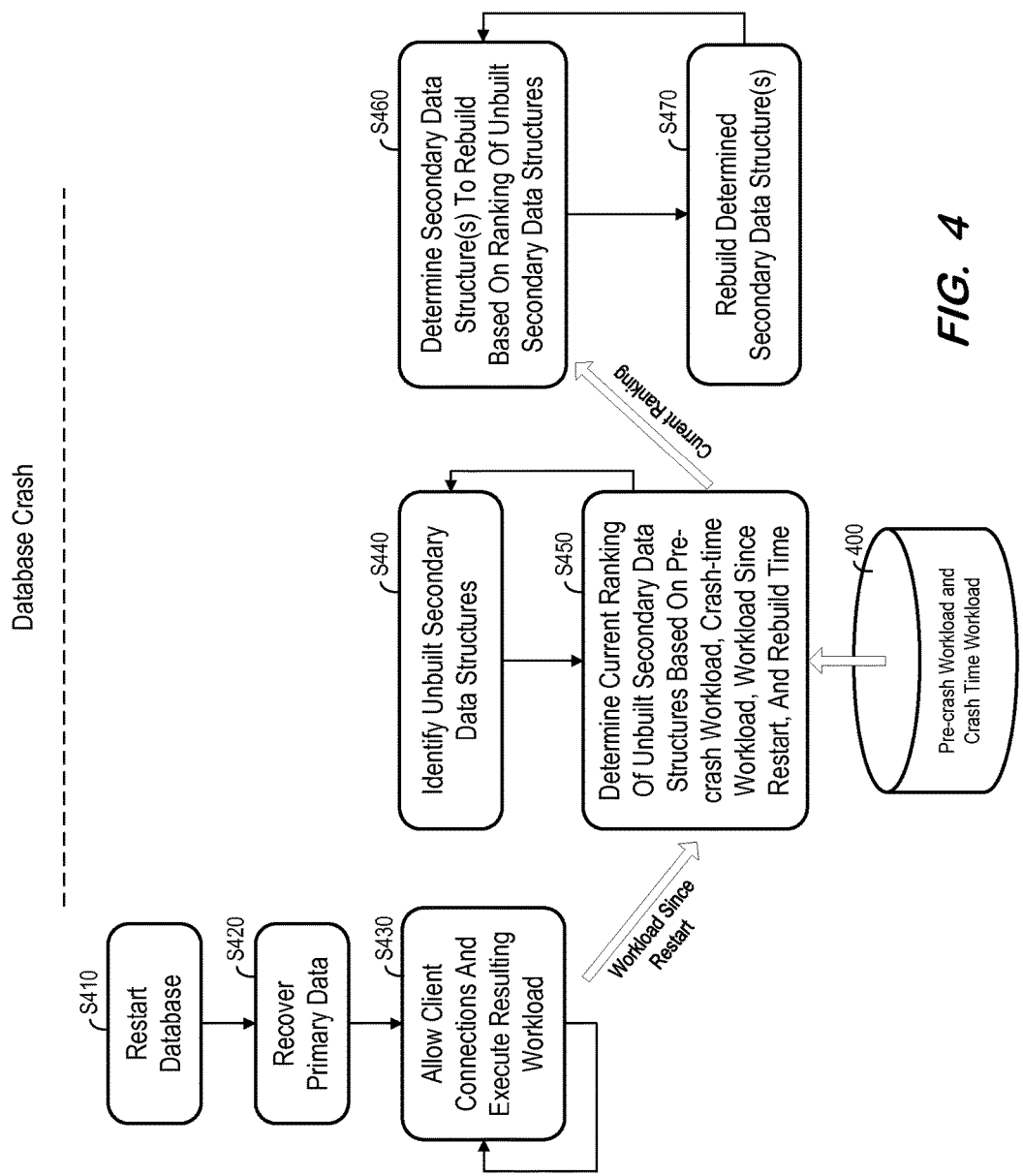
FIG. 4 is a diagram of database recovery processes according to some embodiments.

FIG. 4 comprises a flow diagram of processes according to some embodiments. In some embodiments, various hardware elements of database system 210 execute program code of database engine 212 to perform these processes. All processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A database system crashes prior to execution of the FIG. 4 processes. It will be assumed that the crash causes the loss of performance-enhancing secondary data structures. For example, prior to the crash, these structures may have been stored in DRAM of the database system and are unavailable after the crash due to the volatility of DRAM.

The database is restarted at S410. With reference to system 200 of FIG. 2, restarting may occur at S410 in response to a command received from administrator 230. Next, primary data of the database is recovered at S420. In a case that the primary data are stored in SCM as shown in FIG. 2, S420 may simply consist of running sanity checks and any necessary repairs on the primary data. Embodiments also include conventional database implementations, in which primary data is recovered at S420 using a data backup and one or more log backups as is known in the art. S420 may also include undoing the effects of transactions that were unfinished at the time of the crash.

Client connections are allowed at S430 and the resulting workloads are executed. That is, the database system begins accepting and processing requests at S430, without the benefit of any secondary data structures (or only with the benefit of those secondary structures, if any, which were persisted and recovered along with the primary data). Such processing may therefore occur more slowly than processing which utilizes secondary data structures. As will be described below, processing throughput then increases as secondary structures are rebuilt in parallel with execution of S430.

In this regard, flow continues to cycle through S430 while the other steps of FIG. 4 are executed. In particular, S440 and S450 are executed after the primary data is recovered at S420 and in parallel with the execution of S430. For example, one processing unit (e.g., processor, processor core, processor thread) may execute S430 while another processing unit executes S440 and S450.

Unbuilt secondary data structures are identified at S440. For example, $S_{SCM}$ may be denoted as the set of secondary data structures already in SCM (i.e., SCM) that do not need to be rebuilt as they are available along with the primary data at restart time, and S as the set of all secondary data structures defined in the schema. At S440, it is initially determined that all secondary data structures in $S \backslash S_{SCM}$ must be rebuilt.

Next, at S450, a current ranking of the unbuilt secondary data structures is determined. The rank of a secondary data structure is determined based on a pre-crash workload, a crash-time workload, a workload since restart, and an estimated rebuild time of the secondary data structure. Pre-crash and crash-time workload information 400 may be stored in the primary data persistence (e.g., SCM) and recovered along with the primary data at S420.

According to some embodiments, a rank rank(s, 0) of a secondary data structure s at restart time 0 is computed at S450 based on the observed workload in the immediate past of the crash (WoPast), the workload run at crash time (WoCrash), and the estimated cost of rebuilding s ∈S (rebuild(s)). In some embodiments:

$$rank(s, 0) = Benefit(s, WoPast, WoCrash, S) - rebuild(s)$$

The above formula assumes the existence of a query benefit function Benefit(s, Q, S) of the index s ∈S with respect to S and the statement Q. Examples of such a benefit function are set forth below, namely $Benefit_{indep}$ and $Benefit_{dep}$. Given a workload W, a multi-set of statements (i.e., repeated statements are considered) and a query benefit function Benefit(s, Q, S), the benefit of a secondary data structure s with respect to S for W may be defined as:

$$Benefit(s, W, S) = \Sigma_{Q \in W} Benefit(s, Q, S).$$

Therefore, $$Benefit(s, WoPast, WoCrash, S) = \beta * Benefit(s, WoPast, S) + (1-\beta) * Benefit(s, WoCrash, S)$$

and $$rank(s, 0) = [\beta * Benefit(s, WoPast, S) + (1-\beta) * Benefit(s, WoCrash, S)] - rebuild(s)$$

In the above example, rank(s, 0) is computed as a weighted average, $0 \leq \beta \leq 1$. Also, because rebuild time is considered in the rank( ) formula, the ranks can be negative for data structures for which the rebuild time exceeds the benefit to the workload.

Returning to FIG. 4, the determined ranking of the unbuilt secondary data structures is used at S460 to determine which one or more secondary data structures to rebuild. For example, it may be determined at S460 to rebuild the highest-ranked secondary data structure of the unbuilt data structures. The determined data structure is rebuilt at S470, based on the recovered primary data. Next, flow returns to S460 to determine another secondary data structure to rebuild.

S460 and S470 are executed in parallel with S430 and with S440 and S450. Also, as described above, flow cycles between S440 and S450 to update the current rankings as long as secondary data structures remain to be built. This update may be independent of S460 and S470. Accordingly, when flow returns from S470 to S460 after rebuilding a secondary data structure, the rankings may have changed.

The calculated benefit of a secondary data structure may change as the current workload, run in parallel with the recovery procedure, progresses. The content of the current workload since the restart and up to current time t will be denoted as WoRestart(t) and can be used at S450 to determine the ranking rank(s, t) of the yet-to-be-built structure s $\in S$. With n=sizeof(WoRestart(t)) (i.e., a number of queries which were issued in WoRestart(t)), the following formula computes the ranking at S450 at time t:

$$\text{rank}(s, t) = \alpha(n) * \text{Benefit}(s, \textit{WoPast, WoCrash, S}) + (1-\alpha(n)) * \text{Benefit}(s, \textit{WoRestart}(t), S) - \text{rebuild}(s)$$

$\alpha(n)$ can be defined such that it decays exponentially with n (e.g., $\alpha(n) = \alpha^n$ with $0 \leq \alpha \leq 1$) to increase the weight of the current workload as more statements are seen during the recovery period.

Therefore, while incoming requests are processed at S430, rankings of as-yet unbuilt secondary data structures are continuously updated at S450, and secondary data structures are rebuilt at S470 based on the current rankings. The process continues until all secondary data structures are rebuilt, after which S440 through S470 cease to execute.

The above formulas require a query benefit function, denoted Benefit(s, Q, S). Two examples of such a function are described below. $\text{Benefit}_{indep}$ is based solely on the independent effect of an index s on a statement Q, while $\text{Benefit}_{dep}$ captures the effect of the index s with respect to the whole set of secondary data structures S.

Cost(Q, I) denotes the cost of a statement Q executed when the secondary data structures in $I \subseteq S$ are available, while plan(Q, I) is the best, optimal, plan for Q with the cost Cost(Q, I). If a secondary data structure s $\in I$ is used in the plan(Q, I), the notation s $\in S(\text{plan}(Q, I))$ is used. The existence of a well-behaved optimizer is assumed, which consistently builds the same optimal plan in the presence of the same indexes: i.e., if $I_1 \subseteq I_2$, and $S(\text{plan}(Q, I_2)) \subseteq I_1 \subseteq I_2$, then $\text{plan}(Q, I_2) = \text{plan}(Q, I_1)$.

The time at which query Q was run during WoRestart(t) is denoted $t_Q$, $t_Q \leq t$, and S(t) is the set of indexes available for query execution at time t during recovery. $S(0) = S_{SCM}$, as the only secondary data structures available at the start of recovery are the secondary data structures which are instantly recovered (i.e., stored in SCM).

for Q $\in$ WoRestart(t), WoPast, WoCrash:

$$\text{Benefit}_{indep}(s, Q, S) = \text{Cost}(Q, S_{SCM}) - \text{Cost}(Q, S_{SCM} \cup \{s\})$$

for Q $\in$ WoRestart(t):

$$\text{Benefit}_{dep}(s, Q, S) = \text{Cost}(Q, S(t_Q)) - \text{Cost}(Q, S), s \in S(\text{plan}(s, Q)), \text{ or } 0 \text{ otherwise}$$

for Q $\in$ WoPast $\cup$ WoCrash:

$$\text{Benefit}_{dep}(s, Q, S) = \text{Cost}(Q, S_{SCM}) - \text{Cost}(Q, S), s \in S(\text{plan}(s, Q)), \text{ or } 0 \text{ otherwise}$$

$\text{Benefit}_{indep}$ is defined in isolation from and independent of the other indexes in $S \setminus S_{SCM}$. Using this function, rank(s, t) captures the benefit of having only $S_{SCM} \cup \{s\}$ available when the workloads WoPast, WoCrash, or WoRestart(t) are run.

$\text{Benefit}_{dep}$ captures the dependency of indexes which are used together in the optimal plans: for any index s participating in the optimal plan of Q, i.e., s $\in S(\text{plan}(Q, S))$, the cost difference between the current plan and this ideal plan, i.e., $\text{Cost}(Q, S(t_Q)) - \text{Cost}(Q, S)$, is added to rank(s, t). This formula implies that indexes which are always used together will have the same ranking when the query benefit function $\text{Benefit}_{dep}$ is used.

The estimated costs $\text{Cost}(Q, S_{SCM})$, $\text{Cost}(Q, S_{SCM} \cup \{s\})$, and Cost(Q, S) needed in $\text{Benefit}_{dep}$ and $\text{Benefit}_{indep}$ functions can be computed by a query optimizer during the query optimization of the statement Q. For example, $\text{Cost}(Q, S(t_Q))$ above is exactly the estimated cost of the optimal plan executed when Q was run at time $t_Q$ during recovery, with the available indexes in $S(t_Q)$. The workload statistics capturing WoPast and WoCrash can be collected as statement identifiers, with frequencies, for a fixed window of time. Such statistics are usually recorded by database systems, for example, for security purposes and/or performance tuning.

The following example illustrates how benefits of secondary data structures are computed according to some embodiments. T is a table of two columns, $c_1$ and $c_2$, where each column is associated with a dictionary index and a value ids index. T includes 10 million rows and is populated with randomly-generated data. Q1 and Q2 are two select queries on columns $c_1$ and $c_2$, respectively. The plan for a SELECT statement on a single column can use no index, one index, or two indexes from the dictionary index iDict and the value ids index iValId. Hence, there are four different possible execution plans for each Qi. The query costs for the four execution plans according to some embodiments are presented in the table below.

| Q | Cost(Q, $I_{all}$) | Cost(Q, $I_{iValId}$) | Cost(Q, $I_{iDict}$) | Cost(Q, $\phi$) |
|---|---|---|---|---|
| $Q_1$ | 3 µs | 3182 µs | 4679 µs | 7809 µs |
| $Q_2$ | 3 µs | 3189 µs | 4544 µs | 7947 µs |

Moreover, estimates for the rebuilding costs of each of the four indexes of T are summarized below.

| | iDict($c_1$) | iValId($c_1$) | iDict($c_2$) | iValId($c_2$) |
|---|---|---|---|---|
| rebuild( ) | 14.4 s | 2.4 s | 14.3 s | 2.3 s |

For further analysis, specific workloads may be run with two users. Recovery is executed with a single thread to better highlight the effects of different rebuilding orders of the four indexes. In a first configuration, each one of the two users runs a mix of 50% $Q_1$ and 50% $Q_2$. This workload may be referred to as a uniform mix. In a second configuration, each user continuously runs only a single query, i.e., the workload of one user is 100% $Q_1$, and the one of the other user is 100% $Q_2$. This workload is referred to as one query per user.

Figure 5:
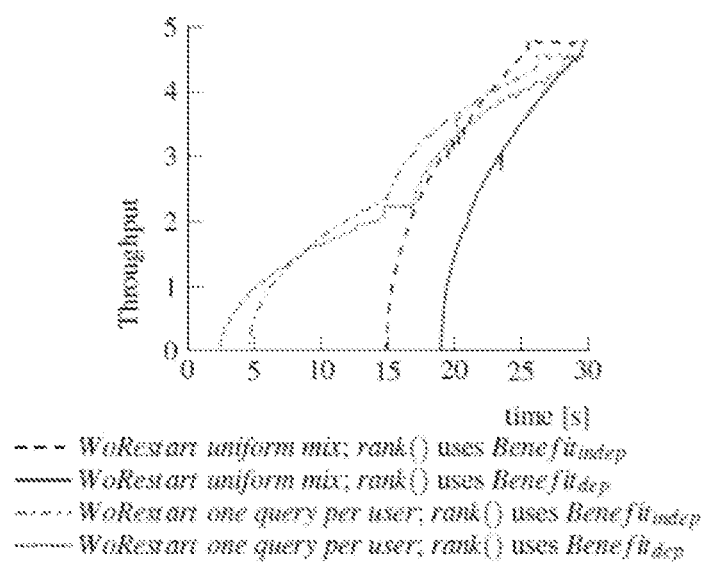
FIG. 5 is a diagram of database recovery throughput performance according to some embodiments.

Each of the two configurations leads to a global workload of 50% $Q_1$ and 50% $Q_2$ during usual processing. However, during the recovery period, the configuration uniform mix exhibits a mix of also 50% $Q_1$ and 50% $Q_2$, while the configuration one query per user may exhibit a very different mix depending on what indexes were rebuilt so far. FIG. 5 depicts throughput results during recovery for the two workloads, using the two benefit functions $Benefit_{indep}$ and $Benefit_{dep}$. For the configuration uniform mix, $Benefit_{indep}$, which does not take into account index dependencies, yields better recovery performance. This is because each user executes the same mix. Therefore, as long as a single query of this mix doesn't yet have the optimal query plan, it decreases the performance. In other words, performance is bound by Amdahl's law. Consequently, it may be better to see the workload as a single piece of work, and rebuild indexes which remove the largest piece of that work first. However, for the configuration one query per user, throughput during recovery is not constituted of 50% $Q_1$ and 50% $Q_2$. Instead, the query that benefits first from the rebuild of secondary data structures will execute more often. Therefore, throughput is regained more quickly, as neither of the users is bound by Amdahl's law.

While $Benefit_{indep}$ and $Benefit_{dep}$ seem to perform similarly, they do not have the same implications on the performance of the two users: $Benefit_{indep}$ does not segregate between the two users and improves performance in a fair manner; $Benefit_{dep}$ however, as it takes into account index dependence, gives the same rank for indexes $iValId(c_i)$ and $iDict(c_i)$ in this experiment: hence, the $iValId(c_i)$ build will be followed by the $iDict(c_i)$ build for the same column $c_i$. This is because these two indexes are always used together in the best plans, and as a consequence have similar $Benefit_{dep}$. Generally, one user recovers entirely its throughput first, then the other user recovers its throughput.

In some embodiments, recovery can either consider the workload as a single piece of work and treat all users equally, be query-driven, or be user-driven. For instance, recovery can be tailored to favor premium users or critical queries.

Figure 6:
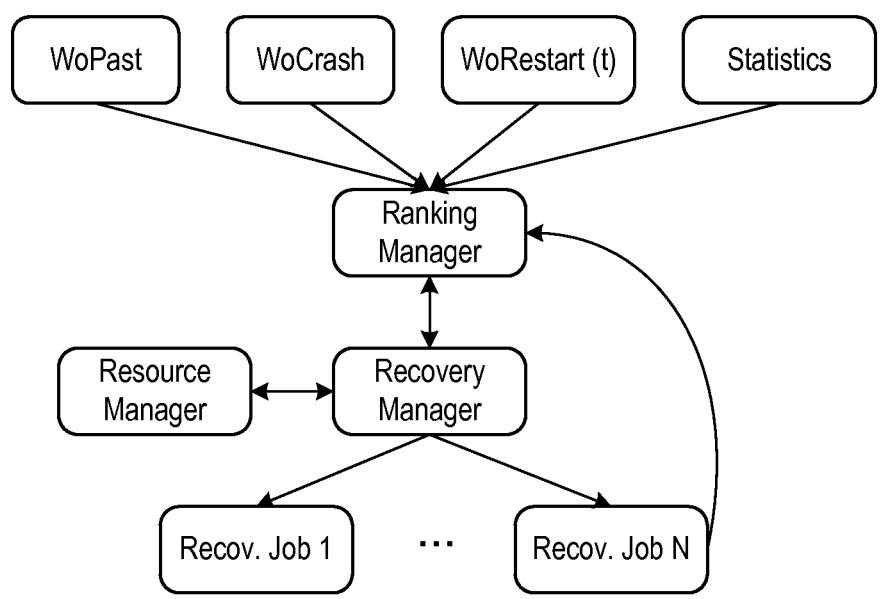
FIG. 6 is a diagram illustrating recovery of secondary data structures according to some embodiments.

FIG. 6 depicts execution of the FIG. 4 processes according to some embodiments. A Ranking Manager uses the above-described values WoPast, WoCrash, WoRestart(t), Cost(Q, $S(t_Q)$), rebuild(s), and pre-crash and crash-time workload to determine rankings of unbuilt secondary structures at S450. A Recovery Manager uses these rankings to issue Recovery Jobs to rebuild secondary data structures based on the rankings at S470.

FIG. 6 also illustrates a Resource Manager, which determines the extent of available resources to provide to the Recovery Manager. In some embodiments, queries are received and processed at S430 during the rebuilding of the secondary data structures, and the Resource Manager determines an amount of system resources to devote to query processing and an amount of system resources to devote to the rebuilding of the secondary data structures. The amount of resources devoted to each process may be static, or may be adaptive, i.e., may change during system recovery.

According to some embodiments, the Resource Manager dynamically allocates resources during the recovery period between the rebuilding of the secondary data structures and query processing, based on a ranking of a currently highest-ranked secondary data structure. In some embodiments, the Recovery Manager gives recovery resources back to query processing as the recovery process moves from rebuilding secondary data structures with higher ranks to secondary data structures with lower ranks.

According to some embodiments, the Resource Manager gives the Recovery Manager a specific budget of resources and the Recovery Manager free to use the budget fully for the recovery of secondary data structures and/or return resources partially/fully to query processing. In some embodiments, the Recovery Manager decides to give back recovery resources to query processing once it detects, based on a threshold, that enough secondary data structures have been rebuilt to allow the system to run at nearly full speed. The remaining secondary data structures are recovered in the background whenever the CPU idles. In a specific example, the Recovery Manager may invest all resources in rebuilding the most important secondary data structures as quickly as possible, and then give back all the resources to query processing and continue rebuilding the remaining secondary data structures in the background whenever the CPU idles.

Some embodiments therefore provide an adaptive recovery approach utilizing a ranking function of secondary data structures and an adaptive resource allocation algorithm, allowing for an improved combination of recovery performance and query processing performance.

Figure 7:
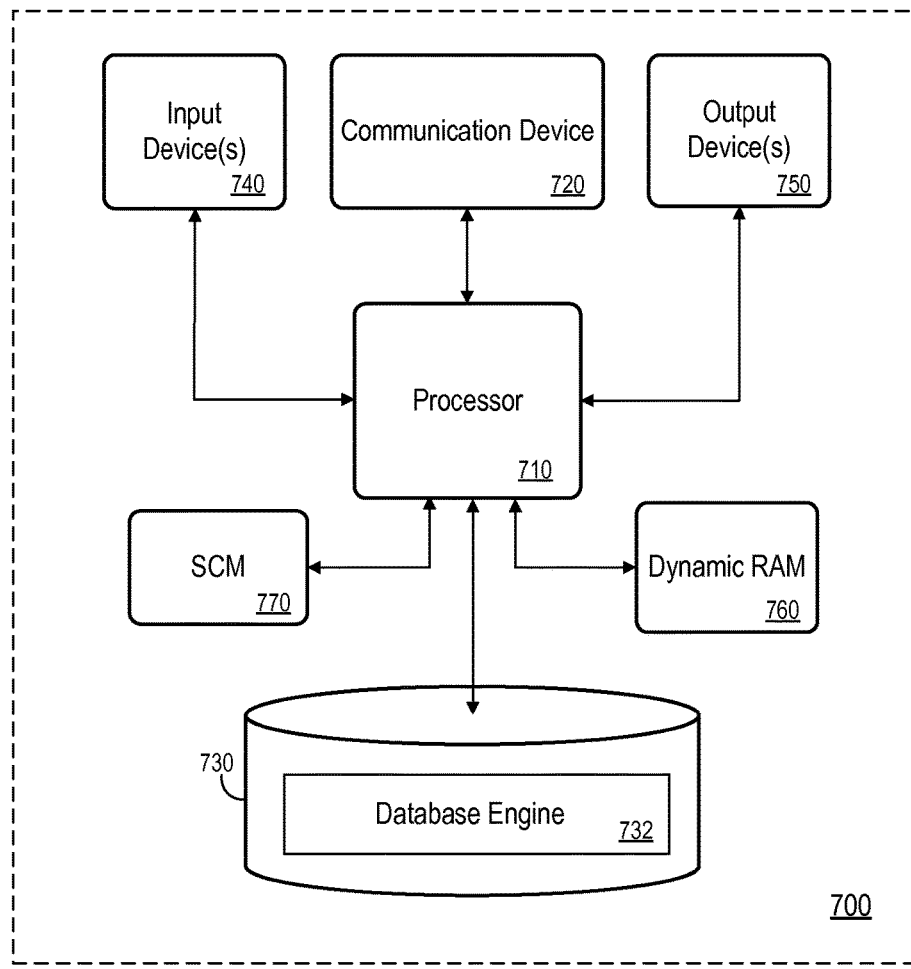
FIG. 7 is a block diagram of an apparatus according to some embodiments.

FIG. 7 is a block diagram of system 700 according to some embodiments. System 700 may comprise a general-purpose computing system and may execute program code to perform any of the processes described herein. System 700 may comprise an implementation of database systems 110 or 210 according to some embodiments. System 700 may include other unshown elements according to some embodiments.

System 700 includes processor 710 operatively coupled to communication device 720, data storage device 730, one or more input devices 740, one or more output devices 750, DRAM 660 and SCM 770. Communication device 720 may facilitate communication with external devices, such as a reporting client, or a backup storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc. Dynamic RAM 760 may be used for storage of secondary data structures as described herein, while SCM 770 may store primary data, pre-crash and crash-time workload information, as well as selected secondary data structures.

Database engine 732 may comprise program code executed by processor 710 to cause apparatus 700 to perform any one or more of the processes described herein. Embodiments are not limited to execution of these processes by a single apparatus. Data storage device 730 may also store data and other program code for providing additional functionality and/or which are necessary for operation of system 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of an embodiment may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
a dynamic random access memory;
a non-volatile random access memory storing primary data of a database; and
a processor to execute processor-executable program code in order to cause the computing system to:
determine a plurality of secondary data structures to be rebuilt;
determine a current ranking for each of the plurality of secondary data structures based on a pre-crash workload, a crash-time workload, a post-crash workload, and a rebuild time of the secondary data structure;
determine to rebuild one of the plurality of secondary data structures based on the determined rankings; and
rebuild the one of the plurality of secondary data structures in the dynamic random access memory based on the primary data of the database stored in the non-volatile random access memory.

2. A computing system according to claim 1, wherein the determination of the current ranking, the determination to rebuild one of the plurality of secondary data structures, and the rebuild of the one of the plurality of secondary data structures are performed in parallel with query processing.

3. A computing system according to claim 2, wherein the rebuild of the one of the plurality of secondary data structures and the query processing share computing system resources.

4. A computing system according to claim 3, wherein the computing system resources are dynamically allocated between the rebuild of the one of the plurality of secondary data structures and the query processing based on the current ranking of the one of the plurality of secondary data structures.

5. A computing system according to claim 2, wherein the current ranking of a secondary data structure is determined based on a pre-crash workload, a crash-time workload, a post-crash workload and a rebuild time of the secondary data structure.

6. A computing system according to claim 5, wherein the processor is to execute processor-executable program code in order to cause the computing system to:
determine a second current ranking for each of a second plurality of secondary data structures;
determine to rebuild a second one of the second plurality of secondary data structures based on the determined second current rankings; and
rebuild the second one of the second plurality of secondary data structures in the dynamic random access memory based on the primary data of the database stored in the non-volatile random access memory.

7. A non-transitory computer-readable medium storing program code, the program code executable by a processor of a computing system to cause the computing system to:
determine a plurality of secondary data structures of a database to be rebuilt;
determine a current ranking for each of the plurality of secondary data structures based on a pre-crash workload, a crash-time workload, a post-crash workload, and a rebuild time of the secondary data structure;
determine to rebuild one of the plurality of secondary data structures based on the determined rankings; and
rebuild the one of the plurality of secondary data structures in a dynamic random access memory based on primary data of a database stored in non-volatile random access memory.

8. A medium according to claim 7, wherein the determination of the current ranking, the determination to rebuild one of the plurality of secondary data structures, and the rebuild of the one of the plurality of secondary data structures are performed in parallel with query processing.

9. A medium according to claim 8, wherein the rebuild of the one of the plurality of secondary data structures and the query processing share resources of the computing system.

10. A medium according to claim 9, wherein the computing system resources are dynamically allocated between the rebuild of the one of the plurality of secondary data structures and the query processing based on the current ranking of the one of the plurality of secondary data structures.

11. A medium according to claim 7, wherein the current ranking of a secondary data structure is determined based on a pre-crash workload, a crash-time workload, a post-crash workload and a rebuild time of the secondary data structure.

12. A medium according to claim 11, wherein the processor is to execute processor-executable program code in order to cause the computing system to:
determine a second current ranking for each of a second plurality of secondary data structures;
determine to rebuild a second one of the second plurality of secondary data structures based on the determined second current rankings; and
rebuild the second one of the second plurality of secondary data structures in the dynamic random access memory based on the primary data of the database stored in non-volatile random access memory.

13. A computer-implemented method comprising:
determining a plurality of secondary data structures of a database to be rebuilt;
for each of the plurality of secondary data structures, determining a current ranking based on a pre-crash workload, a crash-time workload, a post-crash workload, and a rebuild time of the secondary data structure;
determining to rebuild one of the plurality of secondary data structures based on the determined rankings; and
rebuilding the one of the plurality of secondary data structures in a dynamic random access memory based on primary data of a database stored in non-volatile random access memory.

14. A method according to claim 13, wherein the determination of the current ranking, the determination to rebuild one of the plurality of secondary data structures, and the rebuild of the one of the plurality of secondary data structures are performed in parallel with query processing.

15. A method according to claim 14, wherein the rebuild of the one of the plurality of secondary data structures and the query processing share resources of the computer.

16. A method according to claim 15, wherein the computer resources are dynamically allocated between the rebuild of the one of the plurality of secondary data structures and the query processing based on the current ranking of the one of the plurality of secondary data structures.

17. A method according to claim 13, wherein the processor is to execute processor-executable program code in order to cause the computing system to:
- determine a second current ranking for each of a second plurality of secondary data structures based on the pre-crash workload, the crash-time workload, a second post-crash workload, and a rebuild time of the secondary data structure;
- determine to rebuild a second one of the second plurality of secondary data structures based on the determined second current rankings; and
- rebuild the second one of the second plurality of secondary data structures in the dynamic random access memory based on the primary data of the database stored in non-volatile random access memory.

* * * * *